US012121913B2

(12) United States Patent
Nagasu et al.

(10) Patent No.: US 12,121,913 B2
(45) Date of Patent: Oct. 22, 2024

(54) CENTRIFUGE HAVING REMOVABLE WEAR-RESISTANT SLEEVE INSTALLED AT A SOLIDS DISCHARGE PORT OF A BOWL

(71) Applicant: TOMOE ENGINEERING CO., LTD., Tokyo (JP)

(72) Inventors: Masaru Nagasu, Tokyo (JP); Yuhei Tahara, Tokyo (JP)

(73) Assignee: TOMOE ENGINEERING CO., LTD., Tokyo (JP)

( * ) Notice: Subject to any disclaimer, the term of this patent is extended or adjusted under 35 U.S.C. 154(b) by 733 days.

(21) Appl. No.: 17/420,830

(22) PCT Filed: Nov. 1, 2019

(86) PCT No.: PCT/JP2019/043008

§ 371 (c)(1),
(2) Date: Jul. 6, 2021

(87) PCT Pub. No.: WO2020/183779

PCT Pub. Date: Sep. 17, 2020

(65) Prior Publication Data

US 2022/0088614 A1 Mar. 24, 2022

(30) Foreign Application Priority Data

Mar. 13, 2019 (JP) ................................ 2019-045852

(51) Int. Cl.
*B04B 1/20* (2006.01)
*B04B 11/02* (2006.01)

(52) U.S. Cl.
CPC ............ *B04B 1/2008* (2013.01); *B04B 11/02* (2013.01); *B04B 2001/2091* (2013.01)

(58) Field of Classification Search
CPC .................. B04B 1/2008; B04B 11/02; B04B 2001/2091; B04B 7/12; B04B 1/20
See application file for complete search history.

(56) References Cited

U.S. PATENT DOCUMENTS 5,147,277 A * 9/1992 Shapiro .................... B04B 1/20 210/374
7,374,529 B2 5/2008 Hensley et al.
(Continued)

FOREIGN PATENT DOCUMENTS

JP 56-114845 9/1981
JP 61-027646 8/1986
(Continued)

OTHER PUBLICATIONS

English Translation of the International Preliminary Report on Patentability issued Sep. 23, 2021 in International Application No. PCT/JP2019/043008.
(Continued)

*Primary Examiner* — Walter D. Griffin
*Assistant Examiner* — Shuyi S. Liu
(74) *Attorney, Agent, or Firm* — Wenderoth, Lind & Ponack, L.L.P.

(57) ABSTRACT

A centrifuge provided with: a bowl having a plurality of extension lugs formed on an opening rim section at one end of the bowl in the axial direction, the extension lugs being spaced apart from one another in the circumferential direction; a screw conveyer rotatably housed inside the bowl and rotatable at a different rotational speed than the bowl; a hub forming solid discharge ports between circumferentially adjacent pairs of the extension lugs, the hub connecting to the extension lugs and covering an opening of the opening rim section from the axial direction; and a wear-resistant sleeve including a sleeve body and a flange. The sleeve body covers lug inner surfaces of the extension lugs and the flange extends in an arced shape along the opening rim section. The sleeve body is attached with axially extending bolts to the opening rim section at a position that avoids the extension lugs.

7 Claims, 3 Drawing Sheets

(56) References Cited

U.S. PATENT DOCUMENTS

| | | | | |
|---|---|---|---|---|
| 9,393,574 | B1 | 7/2016 | Morris | |
| 9,943,862 | B2 | 4/2018 | Lendzian et al. | |
| 2014/0038806 | A1* | 2/2014 | Lendzian | B04B 7/12<br>494/56 |

FOREIGN PATENT DOCUMENTS

| | | | |
|---|---|---|---|
| JP | 2013-545600 | 12/2013 | |
| JP | 5996548 | 9/2016 | |
| KR | 10-1321078 | 10/2013 | |
| KR | 101321078 B1 * | 10/2013 | B04B 11/04 |

OTHER PUBLICATIONS

International Search Report issued Jan. 28, 2020 in International (PCT) Application No. PCT/JP2019/043008.

* cited by examiner

CENTRIFUGE HAVING REMOVABLE WEAR-RESISTANT SLEEVE INSTALLED AT A SOLIDS DISCHARGE PORT OF A BOWL

BACKGROUND OF THE INVENTION

1. Technical Field

The present invention relates to a centrifuge, and in particular to a wear-resistant sleeve installed at a solid discharge port of a bowl.

2. Description of Related Art

One of centrifuges that centrifuge a treatment object in a solid-liquid mixture state is known as a decanter (for example, see Japanese Utility Model Publication No. 61-27646). FIG. 1 is a diagram depicting a configuration example of a horizontal decanter 1 and is a breakaway view depicting the inside of a casing 2 and the inside of a bowl 3. A configuration of the decanter 1 and problems with the decanter 1 will be described below in brief. A detailed configuration of the decanter 1 will be supplementally described below in embodiments.

The decanter 1 includes a casing 2, a bowl 3 that has a tubular shape and that is housed in the casing 2, and a screw conveyor 4 housed in the bowl 3. The bowl 3 and the screw conveyor 4 rotate around a rotation axis L at different rotation speeds.

A treatment object is fed into the screw conveyor 4 from a treatment object feeding port 81. The treatment object is discharged into the bowl 3 through a treatment object passage 41 formed in a wall surface of the screw conveyor 4. By the action of the bowl 3 and the screw conveyor 4, the treatment object is centrifuged into a separate liquid and solids within the bowl 3. By the action of the bowl 3 and the screw conveyor 4, the separate liquid is conveyed through the bowl 3 and leftward in FIG. 1. Then, the separate liquid is discharged into the casing 2 from a separate liquid discharge port 31 and discharged from the casing 2 to the outside via a separate liquid outlet 21.

By the action of the bowl 3 and the screw conveyor 4, the separated solids are conveyed through the bowl 3 and rightward in FIG. 1. Then, the solids are discharged into the casing 2 from a solid discharge port 32 of the bowl 3 and discharged from the casing 2 to the outside via a solid outlet 22. Note that in the specification, a first end side is defined as the solid discharge port 32 side of the bowl 3, whereas a second end side is defined as the separate liquid discharge port 31 side of the bowl 3.

JP 61-27646 discloses a centrifuge including solid discharge ports having a round shape and formed at regular intervals along a circumferential direction of an outer shell and bushes disposed at the solid discharge ports and having wear resistance. The centrifuge in JP 61-27646 allows any of the bushes to be replaced without disassembling the outer shell (page 4, lines 28 to 29). U.S. Pat. No. 7,374,529 discloses a centrifuge including a plurality of extension lugs provided at an edge of an end opening of the bowl and erected at intervals in the circumferential direction, solid discharge ports each formed between the extension lugs adjacent in the circumferential direction, and liners fastened with bolts to edges of the extension lugs forming the solid discharge ports. The centrifuge disclosed in U.S. Pat. No. 7,374,529 allows any of the liners to be easily replaced by opening the casing of the centrifuge and unfastening the bolt.

However, in the configurations disclosed in the prior art devices, among the solids conveyed by a screw, solids flowing out to positions immediately below the solid discharge ports can be discharged by a centrifugal force, whereas solids flowing out to positions other than the positions immediately below the solid discharge ports stick to an inner wall of the outer shell (bowl) by a centrifugal force and are thus prevented from being discharged. In other words, dead spaces not used to discharge solids are discontinuously generated in the circumferential direction. Accordingly, it is necessary to increase the diameter of the outer shell (bowl), and therefore increase the opening area of the solid discharge ports, in order to increase the amount of solid discharge.

In connection with this problem with the centrifuges disclosed in JP 61-27646 and U.S. Pat. No. 7,374,529, a centrifuge is known that includes arcuately shaped wear resistant plates and bonded to inner surfaces of the respective extension lugs described above (hereinafter referred to as Related Art 1). This centrifuge can guide, to the solid discharge ports, solids flowing out to the dead spaces described above, while sliding the solids along curved surfaces of the plates, thus allowing so-called 360° discharge to be achieved.

However, the centrifuge of Related Art 1 requires much time and effort when a worn plate is replaced. Specifically, as advance preparations for plate replacement, it is necessary to remove piping, belts, guards, and the like, take out the bowl from the casing, install the bowl in a predetermined work space, and then remove a hub. Thus, the advance preparations require much time and effort. Additionally, for provision of the work space, a change in layout in a factory and the like may be forced to be made. Furthermore, a replacement operation for the plate requires scrape-off of an adhesive and re-bonding of a new plate to the extension lug. Thus, maintenance requires much time and effort. Additionally, depending on the type of the solid, the adhesive may be melted and the plate may come off from the extension lug.

Japanese Patent No. 5996548 discloses a centrifuge that can perform 360° discharge and that has an extended maintenance cycle by using a bushing member excellent in wear resistance. In other words, the centrifuge in Japanese Patent No. 5996548 is intended to increase the wear resistance of the bushing member to extend the maintenance cycle.

However, in a case where a treatment liquid includes a solid causing a high grinding force (for example, excavated earth), even a bushing member excellent in wear resistance is worn early, resulting in a shortened maintenance cycle. Thus, a cumbersome maintenance operation including disassembling the centrifuge in an axial direction and replacing the bushing member needs to be performed in a short cycle.

Additionally, since an outer surface of the bushing member needs to be formed into a curved surface (see FIG. 3 of Japanese Patent No. 5996548), the bushing member has an excessively large thickness, and processing costs for forming the curved surface is increased.

SUMMARY OF THE INVENTION

1. Technical Problem

An object of the present invention is to provide a centrifuge that can perform 360° discharge without a need to increase the thickness of an extension lug. Additionally, an object of the present invention is to facilitate replacement of a wear-resistant sleeve installed at a solid discharge port.

2. Solution to the Problem

To achieve the object described above, the present invention provides (1) a centrifuge including a bowl including a plurality of extension lugs provided at an opening edge on a first end side of the bowl in an axial direction and formed at intervals along a circumferential direction, a screw conveyor rotatably housed inside the bowl and rotating at a rotation speed different from a rotation speed of the bowl, a hub connected to the extension lugs to cover an opening at the opening edge in the axial direction to form solid discharge ports between the extension lugs adjacent in the circumferential direction, and wear-resistant sleeves each including a sleeve main body at least covering a lug inner surface of the extension lug facing a rotation axis of the bowl and flange portions arcuately extending along the opening edge and removably installed, with fastening bolts extending in the axial direction, on the opening edge at positions other than a position of the extension lug.

(2) The centrifuge according to (1) described above, wherein an opposite surface of the above-described sleeve main body facing the above-described extension lug in a radial direction of the above-described bowl is provided with a linear protruding portion formed in line contact with the above-described extension lug and extending in a parallel direction parallel to the axial direction.

(3) The centrifuge according to (2) described above, wherein the above-described linear protrusion contacts a central portion of the above-described extension lug in the circumferential direction.

(4) The centrifuge according to any one of (1) to (3) described above, wherein vertical wall portions for protecting both side surface of the above-described extension lug in the circumferential direction are respectively formed at both ends of the above-described sleeve main body in a solid discharge direction.

(5) The centrifuge according to (4) described above, wherein the above-described vertical wall portions are formed in a gradual increase shape in which a height of the vertical wall portion increases from the first end side toward a second end side in the above-described parallel direction.

(6) The centrifuge according to any one of (1) to (5) described above, wherein the above-described extension lug is formed in a stepped shape including a thick wall portion and a thin wall portion respectively located at a leading end and a base end of the above-described extension lug in the above-described parallel direction, and the above-described lug inner surface is formed on the above-described thin wall portion.

(7) The centrifuge according to any one of (1) to (6) described above, wherein the above-described flange portions are respectively formed protruding from both ends of the above-described sleeve main body in the circumferential direction as viewed in the above-described axial direction.

3. Advantageous Effects of the Invention

According to the present invention, solids discharged to a vicinity of the inner surface of the extension lug can be guided to the solid discharge port, while being slid along the wear-resistant sleeve. Thus, both solids flowing out to a position immediately below the solid discharge port and solids flowing out to a position other than the position immediately below the solid discharge port can be discharged from the solid discharge port (360° discharge). Thus, an increase in the diameter of the bowl is not necessary to increase the discharge amount of solids discharged. Additionally, the wear-resistant sleeve can be replaced simply by opening a casing of the centrifuge and unfastening the bolts. When the wear-resistant sleeve is replaced, the centrifuge need not be disassembled in the axial direction. Thus, a burden on a maintenance operation is alleviated.

DETAILED DESCRIPTION OF EMBODIMENTS OF THE INVENTION

First Embodiment

Figure 1:
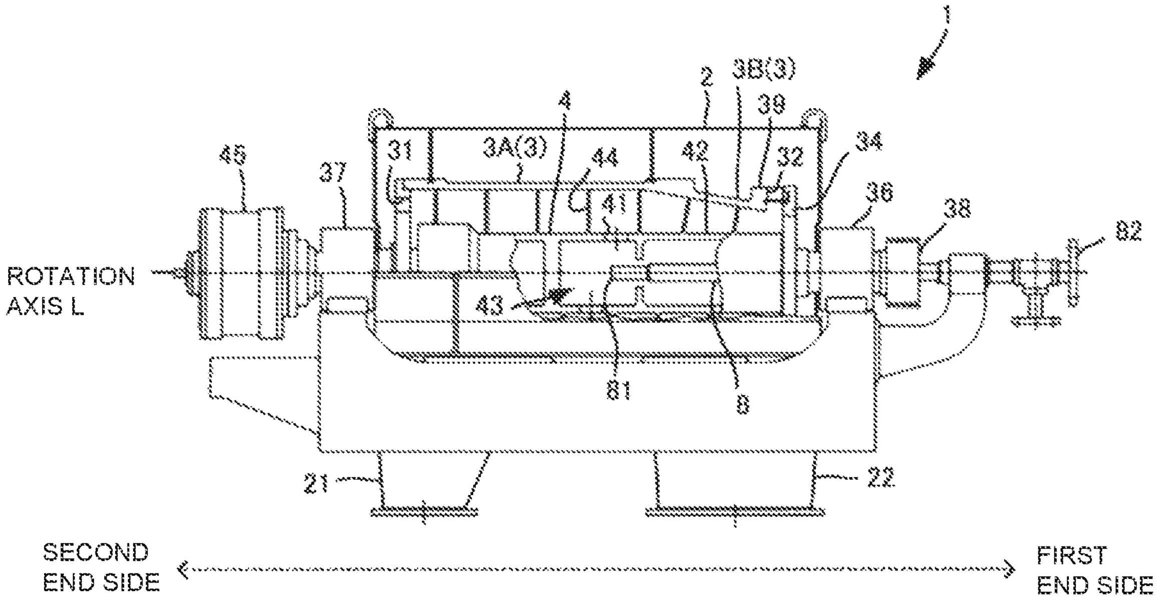
FIG. 1 is a diagram depicting a configuration example of a horizontal decanter.

A centrifuge corresponding to a preferred embodiment of the present invention will be described below by taking a horizontal decanter 1 in FIG. 1 as an example. The decanter 1 includes wear-resistant sleeves having a configuration different from that of wear-resistant sleeves in the related art. In interpretation, the technical scope of the present invention is not limited by embodiments described below.

Figure 2:
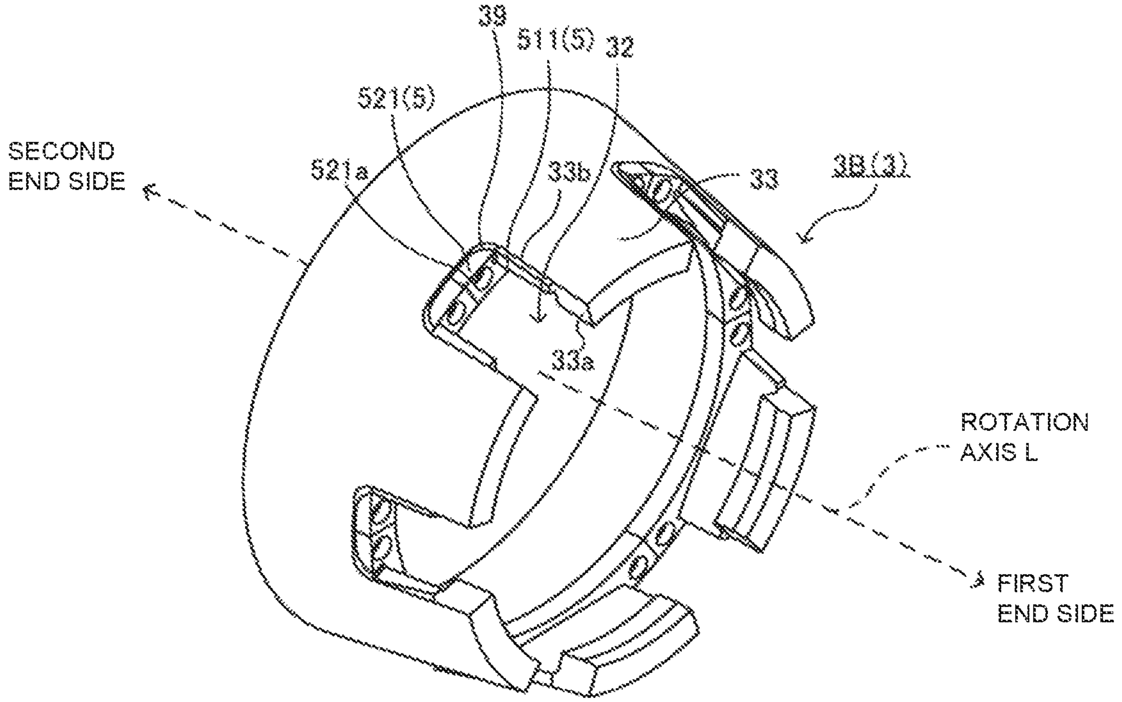
FIG. 2 is a perspective view of a bowl extension from which a hub and bolts have been removed.
Figure 3:
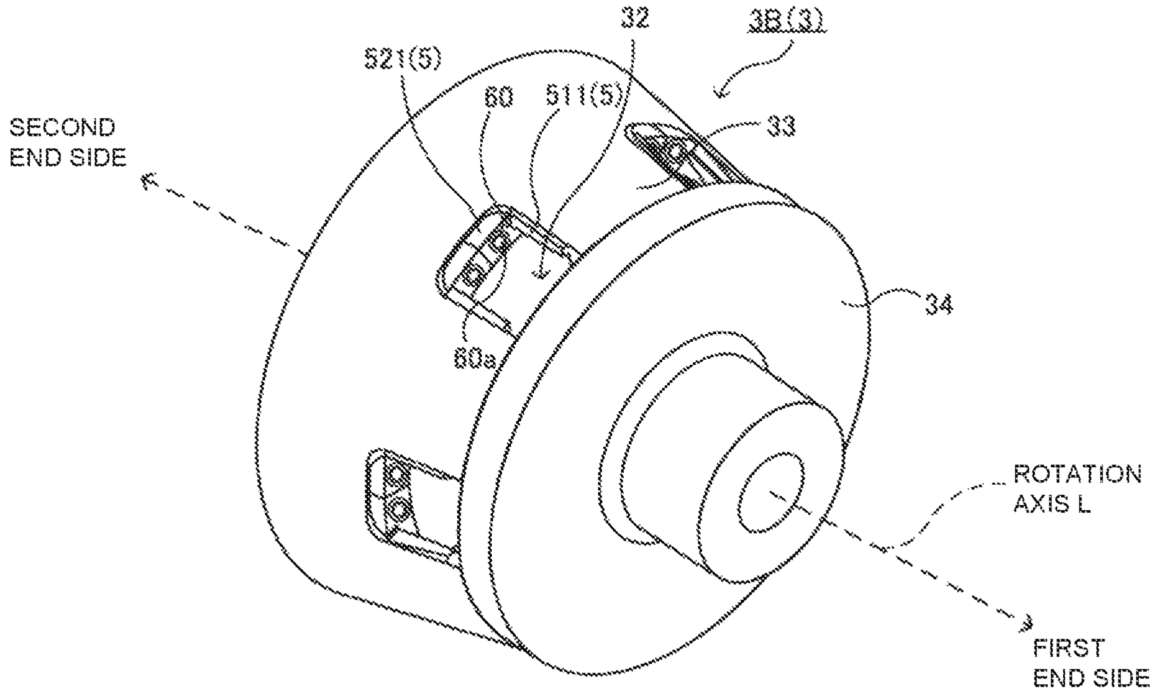
FIG. 3 is a perspective view of the bowl extension with the hub installed on and the bolts fastened to the bowl extension.

The decanter 1 includes a casing 2, a bowl 3, and a screw conveyor 4. The casing 2 houses the bowl 3 and the screw conveyor 4. The casing 2 is configured in an openable manner, and opening the casing 2 makes the bowl 3, solid discharge ports 32, wear-resistant sleeves 5, a hub 34, and the like visible as depicted in FIGS. 2 and 3 described below. The bowl 3 includes a bowl shell 3A and a bowl extension 3B. The bowl shell 3A is formed in a cylindrical shape having a constant inner diameter, and the bowl extension 3B is formed in a truncated conical shape. The bowl shell 3A and the bowl extension 3B are coupled with bolts not depicted in the drawings. However, the present invention is also applicable to the bowl 3 with the bowl extension 3B having a constant inner diameter. The bowl 3 includes a plurality of solid discharge ports 32 on a first end side (right side in FIG. 1) and a plurality of separate liquid discharge ports 31 on a second end side (left side in FIG. 1).

A shaft portion on the first end side of the bowl 3 is rotatably supported by a bearing 36, and a shaft portion on the second end side of the bowl 3 is rotatably supported by a bearing 37. The bowl 3 is rotated by driving of the shaft portion on the first end side by a pulley 38.

The screw conveyor 4 is rotatably held and housed within the bowl 3. A treatment object feeding chamber 43 is formed in a shell portion 42 of the screw conveyor 4. A treatment object feeding port 81 corresponding to an end of a feeding pipe 8 extends into the treatment object feeding chamber 43. The feeding pipe 8 extends toward the first end side (right side in FIG. 1) in the direction of a rotation axis L of the bowl 3 and through the bearing 36 and the pully 38 to the outside of the casing 2. A treatment object loading port 82 is formed at an end of the feeding pipe 8 located outside the casing 2, and a treatment object to be centrifuged is fed via the treatment object loading port 82. The treatment object is fed from the treatment object feeding port 81 into the treatment object feeding chamber 43 through the feeding pipe 8.

The treatment object includes various solid-liquid mixtures in which solids can be separated from liquids by centrifugation. The present invention is particularly suitable for a separate liquid including excavated earth causing a high grinding force. Note that the present invention is of course suitable for a separate liquid including abrasive particles, such as slurry containing metal hydroxide particles and slurry containing carbon particles.

The treatment object flows through a plurality of treatment object passages 41 formed in an outer circumferential surface of the treatment object feeding chamber 43, and runs into the bowl 3.

A screw blade 44 in a helical shape is formed around an outer circumferential surface of a shell portion 42. The screw conveyor 4 is rotated, by power transmitted to the screw conveyor 4 from a gear box 45, at a rotation speed different from the rotation speed of the bowl 3. For example, a planetary gear can be used for the gear box 43.

The screw conveyor 4 is rotated at the rotation speed different from the rotation speed of the bowl 3 to centrifuge the treatment object into separate liquid and solids (separate substances) with the bowl 3. By the action of the bowl 3 and the screw conveyor 4, the separate liquid flows through the bowl 3 toward the second end side and is discharged into the casing 2 from the separate liquid discharge ports 31 and discharged from the inside of the casing 2 to the outside via a separate liquid outlet 21.

The screw conveyor 4 conveys, to the first end side of the bowl 3, solids to which a centrifugal force is applied within the bowl 3. The solids are discharged from the solid discharge ports 32 on the first end side of the bowl 3 toward the inside of the casing 2 and discharged from the inside of the casing 2 to the outside via a solid outlet 22.

Figure 4:
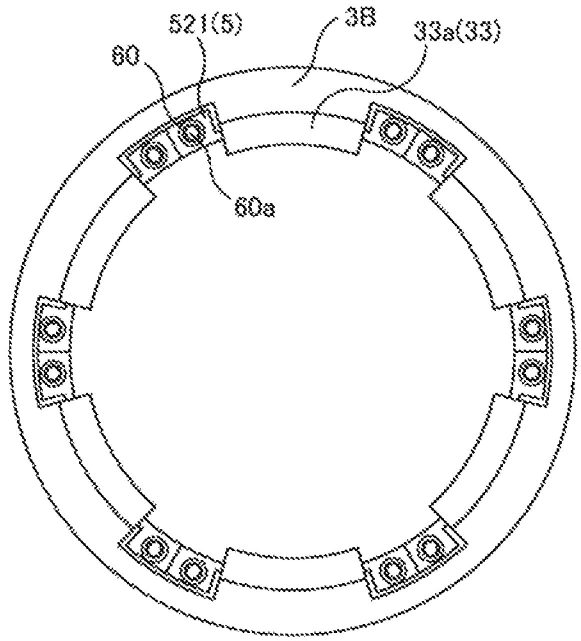
FIG. 4 is a front view of the bowl extension as seen in the direction of a rotation axis L.
Figure 5:
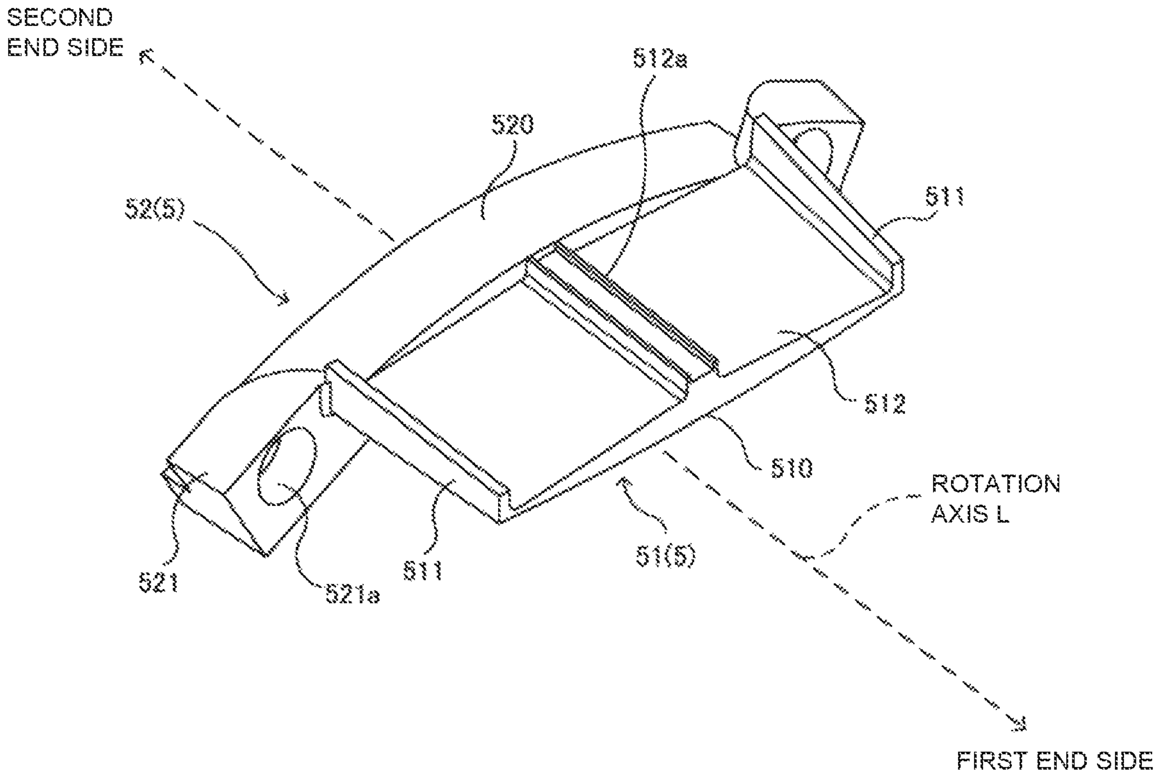
FIG. 5 is a perspective view of a wear-resistant sleeve.
Figure 6:
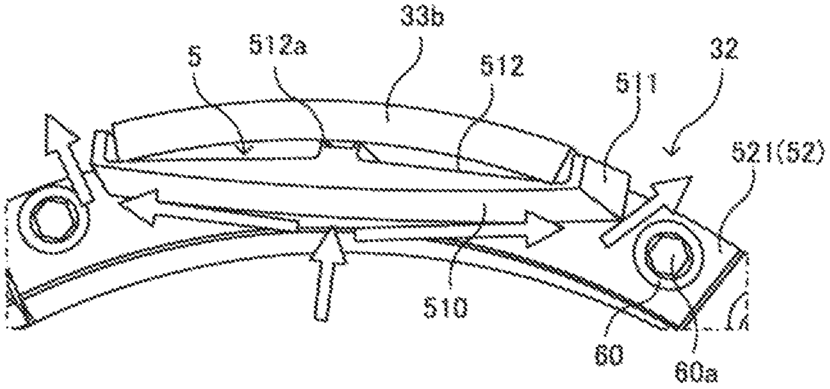
FIG. 6 is another perspective view of the wear-resistant sleeves, which is different from FIG. 5.

FIGS. 2 and 3 are perspective views of the bowl extension 3B. FIG. 2 depicts the bowl extension 3B from which the hub 34 and the bolts 60 have been removed, and FIG. 3 depicts the bowl extension 3B with the hub 34 installed on and the bolts 60 fastened to the bowl extension 3B. FIG. 4 is a front view of the bowl extension 3B as seen in the direction of the rotation axis L. FIG. 5 is a perspective view of the wear-resistant sleeve 5. FIG. 6 is another perspective view of the wear-resistant sleeve, which is different from FIG. 5, also depicts a lug thin wall portion **33*b* described below in order to clarify arrangement of the wear-resistant sleeve 5. Note that blank arrows depicted in FIG. 6** indicate moving directions of solids.

With reference to FIG. 2 and FIG. 3, an opening edge 39 is formed in a ring shape on the first end side of the bowl extension 3B and includes a plurality of extension lugs 33 erected at intervals along the circumferential direction. Hereinafter, a direction parallel to the rotation axis L may be referred to as a parallel direction L'. The extension lug 33 has a stepped shape. One end side of the extension lug 33 in the parallel direction L' is formed to be thick (hereafter, this portion is referred to as a lug thick wall portion **33*a*). Second end side of the extension lug 33 in the parallel direction L' is formed to be thin (hereafter, this portion is referred to as a lug thin wall portion 33*b*). In other words, the lug thick wall portion 33*a* is formed thicker than the lug thin wall portion 33*b*** in the radial direction.

As seen in FIGS. 5 and 6, the wear-resistant sleeve 5 includes a sleeve main body 51 and a flange portion 52. The sleeve main body 51 is disposed between the rotation axis L and the lug thin wall portion **33*b* of the extension lug 33 (see FIG. 2 and FIG. 3). In other words, the sleeve main body 51 is positioned covering, in the radial direction of the bowl 3, a lug inner surface of the lug thin wall portion 33*b* that faces the rotation axis L. A second end of the sleeve main body 51 in the parallel direction L' is connected to a first end of the flange portion 52 in the parallel direction L' to constitute the wear-resistant sleeve 5**.

The wear-resistant sleeve 5 is desirably formed of a material that is more rigid than a base material for the extension lugs 33. As a material that is more rigid than the base material for the extension lugs 33, for example, IGETALLOY (registered trademark) can be used, which is a cemented carbide. However, the wear-resistant sleeve 5 may be formed of a material similar to the material for the extension lug 33, and a welding layer offering high wear resistance may be formed on a surface of the wear-resistant sleeve 5. Increased wear resistance of the wear-resistant sleeve 5 allows a replacement cycle for the wear-resistant sleeve 5 to be extended.

In this regard, for convenience of description, a sliding surface 510 is defined as a surface of the sleeve main body 51 that faces the rotation axis L, vertical wall surfaces 511 are defined as surfaces respectively formed at both ends of the sliding surface 510 in the circumferential direction, and a non-sliding surface 512 is defined as a surface opposite to the sliding surface 510 (in other words, the surface facing the lug thin wall portion **33*b***).

The sliding surface 510 is formed in an appropriate shape that allows solids conveyed to the first end side of the bowl 3 to be guided toward the solid discharge port 32. The sliding surface 510 of the present embodiment is bent in a direction in which the sliding surface 510 protrudes toward the rotation axis L. A central portion of the sliding surface 510 in the circumferential direction is located in closest proximity to the rotation axis L, and both ends of the sliding surface 510 in the circumferential direction (in other words, ends located in proximity to the solid discharge ports 32) are spaced farthest apart from the rotation axis L. In the present embodiment, the sliding surface 510 is formed of a curved surface. However, the present invention is not limited to this, and the sliding surface 510 may be formed of a tapered surface extending toward the solid discharge port 32.

The vertical wall surface 511 is formed at a position where the vertical wall surface 511 covers a side surface of the lug thin wall portion **33*b* of the extension lug 33. This enables solids having reached a terminal portion of the sliding surface 510 to be discharged from the solid discharge port 32 while being slid along the vertical wall surface 511, allowing the side surface of the extension lug 33** to be protected from sliding friction.

The vertical wall surface 511 is preferably formed in a gradually increasing shape in which the height of the vertical wall surface 511 increases from the first end side toward the second end side in the parallel direction L'. The second end side of the wear-resistant sleeve 5 involves a larger amount of solids discharged than the first end side of the wear-resistant sleeve 5, and thus an increased height of the second end side, which is susceptible to wear, allows the life of the extension lug 33 to be extended. On the other hand, the first end side of the wear-resistant sleeve 5 involves a relatively small amount of solids discharged and has low necessity of protection, and thus, reducing materials enables a reduction in costs.

The non-sliding surface 512 includes two linear protruding portions 512*a* at the center of the non-sliding surface 512 in the circumferential direction, and the linear protruding portions 512*a* extend along the parallel direction L' into contact with the center of the lug thin wall portion 33*b* in the circumferential direction. As illustrated in FIG. 6, both ends of the non-sliding surface 512 in the circumferential direction are respectively in contact with both ends of the lug thin wall portion 33*b* in the circumferential direction. By bringing the linear protruding portion 512*a* into line contact with the lug thin wall portion 33*b*, a positioning operation is facilitated when the wear-resistant sleeves 5 are fastened.

In this regard, a method is also possible in which the linear protruding portion 512*a* is omitted and in which the non-sliding surface 512 is in surface contact with the lug thin wall portion 33*b*. In this case, the non-sliding surface 512 needs to be processed such that the non-sliding surface 512 and the lug thin wall portion 33*b* have the same curvature, leading to a need for much time and effort for the processing. Additionally, a processing error may prevent the surface contact. Thus, in the present embodiment, the linear protruding portions 512*a* formed on the non-sliding surface 512 facilitate positioning of the wear-resistant sleeve 5.

The flange portion 52 is formed in an arcuate shape and extends along the opening edge 39. This allows the opening edge 39 to be protected from sliding friction caused by solids. The flange portion 52 includes a cutout shape portion 520 formed to avoid interference with the extension lugs 33, and includes flange fixation portions 521 respectively formed at both ends of the flange portion 52. In other words, the flange fixation portions 521 are respectively formed protruding from both ends of the sleeve main body 51 in the circumferential direction as viewed in the direction of the rotation axis L.

Each of the flange fixation portions 521 is provided with a flange bolt opening 521*a*. The opening edge 39 is provided with a bowl bolt opening not illustrated and that is in communication with the flange bolt opening 521*a*. By fastening the fastening bolts 60 from the first end side in the parallel direction L' toward the flange bolt openings 521*a* and the bowl bolt openings, the wear-resistant sleeve 5 can be removably installed on the bowl extension 3B. As the fastening bolts 60, for example, hexagon socket head bolts can be used. By engaging a hexagonal wrench with a hexagon socket 60*a* in the fastening bolt 60, the fastening bolt 60 can be fastened and unfastened.

The flange fixation portions 521 of the wear-resistant sleeves 5 adjacent in the circumferential direction are in contact with each other. This allows the size of a gap formed between the adjacent wear-resistant sleeves 5 to be set to a very small value.

In this regard, the flange portion 52 may protrude further on the inner side than the opening edge 39 of the bowl extension 3B in the radial direction and may be used as a weir for temporarily holding solids. In this case, solids flowing out from the first end side of the bowl 3 are temporarily held back by the weir of the flange portion 52 and accumulated, and when an accumulation thickness exceeds the height of the weir, the solids are discharged from the solid discharge port 32. As described above, the wear-resistant sleeve 5 can be easily installed on and removed from the bowl 3 and can thus be easily replaced with the wear-resistant sleeve 5 including a weir with a different height, if necessary.

Additionally, in the present embodiment, the surface of the flange fixation portion 521 on the first end side is formed along a direction orthogonal to the rotation axis L. However, the present invention is not limited to this, and the surface of the flange fixation portion 521 on the first end side may be formed using a tapered surface or the like. This allows the amount of solids discharged to be adjusted.

Now, with reference to FIG. 6, a discharge operation for solids will be described. Among those of the solids separated from the treatment object within the bowl 3 which are conveyed to the first end side of the bowl 3, solids discharged to an area corresponding to the solid discharge port 32 are directly discharged from the solid discharge ports 32 by a centrifugal force. On the other hand, among the solids conveyed to the first end side of the bowl 3, solids discharged to an area corresponding to the extension lug 33 come into contact with the sliding surface 510 by a centrifugal force and then flow along the sliding surface 510 in the directions of blank arrows. The solids are then discharged from the solid discharge port 32.

According to the configuration of the present embodiment, solids can be discharged toward the casing 2 in the 360° direction around the rotation axis L. Protection of the extension lug 33 by the wear-resistant sleeve 5 allows suppression of a reduction in the thickness of the extension lug 33 caused by sliding friction. Consequently, the thickness of the extension lug 33 need not be increased to achieve 360° discharge. Additionally, with 360° discharge achieved, an increased opening area of the solid discharge port 32 is not necessary to increase a discharge area for solids (in other words, the diameter of the bowl 3 need not be increased).

Now, with reference to FIG. 3, a replacement method for the wear-resistant sleeve 5 will be described. A hexagonal wrench is inserted into the solid discharge port 32 and engaged with the head hexagon socket 60*a* of the fastening bolt 60. When the hexagonal wrench is rotated counterclockwise, the fastening bolt 60 is loosened and unfastened. Once the fastening bolts 60 are unfastened, the wear-resistant sleeve 5, which is now free, can be taken out of the bowl extension 3B through the solid discharge port 32. In a case where the wear-resistant sleeve 5 is installed, an operation reverse to the removal operation described above may be performed.

As described above, according to the configuration of the present embodiment, attachment and removal of the wear-resistant sleeve 5 to and from the extension lug 33 can be easily performed without removal of the hub 34 of the bowl 3 or the like. In other words, opening the casing 2 makes the heads of the bolts 60 visible, and thus by engaging the hexagonal wrench with the head of the bolt 60 and unfastening the bolt 60, the wear-resistant sleeve 5 can be easily replaced via the solid discharge port 32.

The known configuration enabling the 360° discharge requires, as advance preparations for plate replacement, removing piping, belts, guards, and the like, then taking out the bowl from the casing, installing the bowl taken out in a predetermined work space, and removing the hub. Thus, the advance preparations are very cumbersome. According to the present embodiment, the advance preparations can be completed simply by opening the casing 2 without pulling out the wear-resistant sleeve 5 in the direction of the rotation axis L. Additionally, according to the configuration of the present embodiment, a change in layout in a factory and the like are not necessary to provide a work space. Furthermore, a need for an adhesive used as a securing means for the wear-resistant sleeve 5 and the extension lug 33 is eliminated, and thus operations such as scrape-off and application of the adhesive are not required. Furthermore, the present embodiment enables a reduction in the likelihood of defects such as coming off, from the extension lug 33, of the adhesive melted by solids.

REFERENCE SIGNS LIST

1 Centrifuge
3 Bowl
3A Bowl shell
3B Bowl extension
4 Screw conveyor
5 Wear-resistant sleeve
31 Separate liquid discharge port
32 Solid discharge port
33 Extension lug
33*a* Lug thick wall portion
33*b* Lug thin wall portion
34 Hub
39 Opening edge
51 Sleeve main body
52 Flange portion
510 Sliding surface
511 Vertical wall surface
512 Non-sliding surface
512*a* Linear protruding portion

The invention claimed is:

1. A centrifuge comprising:

a bowl comprising a plurality of extension lugs provided at an opening edge on a first end side of the bowl in an axial direction and formed at intervals along a circumferential direction;

a screw conveyor rotatably housed inside the bowl and capable of rotating at a rotation speed different from a rotation speed of the bowl;

a hub connected to the plurality of extension lugs to cover an opening at the opening edge in the axial direction to form solid discharge ports between the plurality of extension lugs adjacent in the circumferential direction; and wear-resistant sleeves each comprising a sleeve main body at least covering a lug inner surface of one of the plurality of extension lugs facing a rotation axis of the bowl and a flange portion arcuately extending along the opening edge and removably installed, with fastening bolts extending in the axial direction, on the opening edge at positions other than a position of the one of the plurality of extension lugs, wherein each of the plurality of extension lugs is formed in a stepped shape including a thick wall portion and a thin wall portion respectively located at a leading end and a base end of each of the plurality of extension lugs in the parallel direction and the lug inner surface is formed on the thin wall portion.

2. The centrifuge according to claim 1, wherein an opposite surface of the sleeve main body facing the one of the plurality of extension lugs in a radial direction of the bowl is provided with a linear protruding portion formed in line contact with the one of the plurality of extension lugs and extending in a parallel direction parallel to the axial direction.

3. The centrifuge according to claim 2, wherein the linear protrusion contacts a central portion of the one of the plurality of extension lugs in the circumferential direction.

4. The centrifuge according to claim 1, wherein vertical wall portions for protecting both side surfaces of the one of the plurality of extension lugs in the circumferential direction are respectively formed at both ends of the sleeve main body in a solid discharge direction.

5. The centrifuge according to claim 4, wherein the vertical wall portions are formed in a gradually increasing shape in which a height of the vertical wall portion increases from the first end side toward a second end side in the parallel direction.

6. The centrifuge according to claim 1, wherein the flange portions are respectively formed protruding from both ends of the sleeve main body in the circumferential direction as viewed in the axial direction.

7. A centrifuge comprising:

a bowl comprising a plurality of extension lugs provided at an opening edge on a first end side of the bowl in an axial direction and formed at intervals along a circumferential direction;

a screw conveyor rotatably housed inside the bowl and capable of rotating at a rotation speed different from a rotation speed of the bowl;

a hub connected to the plurality of extension lugs to cover an opening at the opening edge in the axial direction to form solid discharge ports between the plurality of extension lugs adjacent in the circumferential direction; and wear-resistant sleeves each comprising a sleeve main body at least covering a lug inner surface of one of the plurality of extension lugs facing a rotation axis of the bowl and a flange portion arcuately extending along the opening edge and removably installed, with fastening bolts extending in the axial direction, on the opening edge at positions other than a position of the one of the plurality of extension lugs, wherein vertical wall portions for protecting both side surfaces of the one of the plurality of extension lugs in the circumferential direction are respectively formed at both ends of the sleeve main body in a solid discharge direction, and wherein the vertical wall portions are formed in a gradually increasing shape in which a height of each of the vertical wall portions increases from the first end side toward a second end side in the parallel direction.

* * * * *